United States Patent [19]

Souder, Jr. et al.

[11] 4,266,747
[45] May 12, 1981

[54] EQUIPOISED ARTICULATED SUPPORT ARM

[75] Inventors: James J. Souder, Jr., Ann Arbor; Edward D. Scarborough, Jr., Inkster; Merlin D. Fox, Ann Arbor, all of Mich.

[73] Assignee: Positioning Devices, Incorporated, Cincinnati, Ohio

[21] Appl. No.: 61,135

[22] Filed: Jul. 26, 1979

[51] Int. Cl.³ .............................................. E04G 3/00
[52] U.S. Cl. ............................ 248/280.1; 248/123.1; 248/586
[58] Field of Search .................. 248/280.1, 586, 123.1, 248/325, 589, 593, 125, 585, 281.1, 183, 124, 122

[56] References Cited

U.S. PATENT DOCUMENTS

| | | | |
|---|---|---|---|
| 1,453,685 | 5/1923 | Longenbaugh | 248/281.1 |
| 2,090,439 | 8/1937 | Carwardine | 248/586 X |
| 2,131,693 | 9/1938 | Smith | 248/586 X |
| 2,287,577 | 6/1942 | Stava | 248/586 |
| 2,834,568 | 5/1958 | Foster | 248/593 |
| 3,122,348 | 2/1964 | Wilkinson | 248/586 |
| 3,426,190 | 2/1969 | Bobrick | 248/593 X |
| 3,476,931 | 11/1969 | Fletcher | 248/593 X |

Primary Examiner—J. Franklin Foss
Attorney, Agent, or Firm—Krass, Young & Schivley

[57] ABSTRACT

An equipoising arm structure which can support relatively heavy objects, yet is compact in shape, and which can be counterbalanced by commercially available springs. The mechanism employs conventional parallelogram linkages for its lower and upper arms, with the lower arm being connected between a base bracket and a floating bracket, and the upper arm being connected between the floating bracket and a support bracket for the object. The upper arm includes a unique springing arrangement in which the ends of the springs attached to the brackets are connected beyond the conventional point of connections so as to maximize the lift of the springs when the upper arm is horizontally disposed. Means are provided for compensating for the non-linearity of such a springing arrangement over the range of angles of the upper arm that would otherwise normally occur.

16 Claims, 14 Drawing Figures

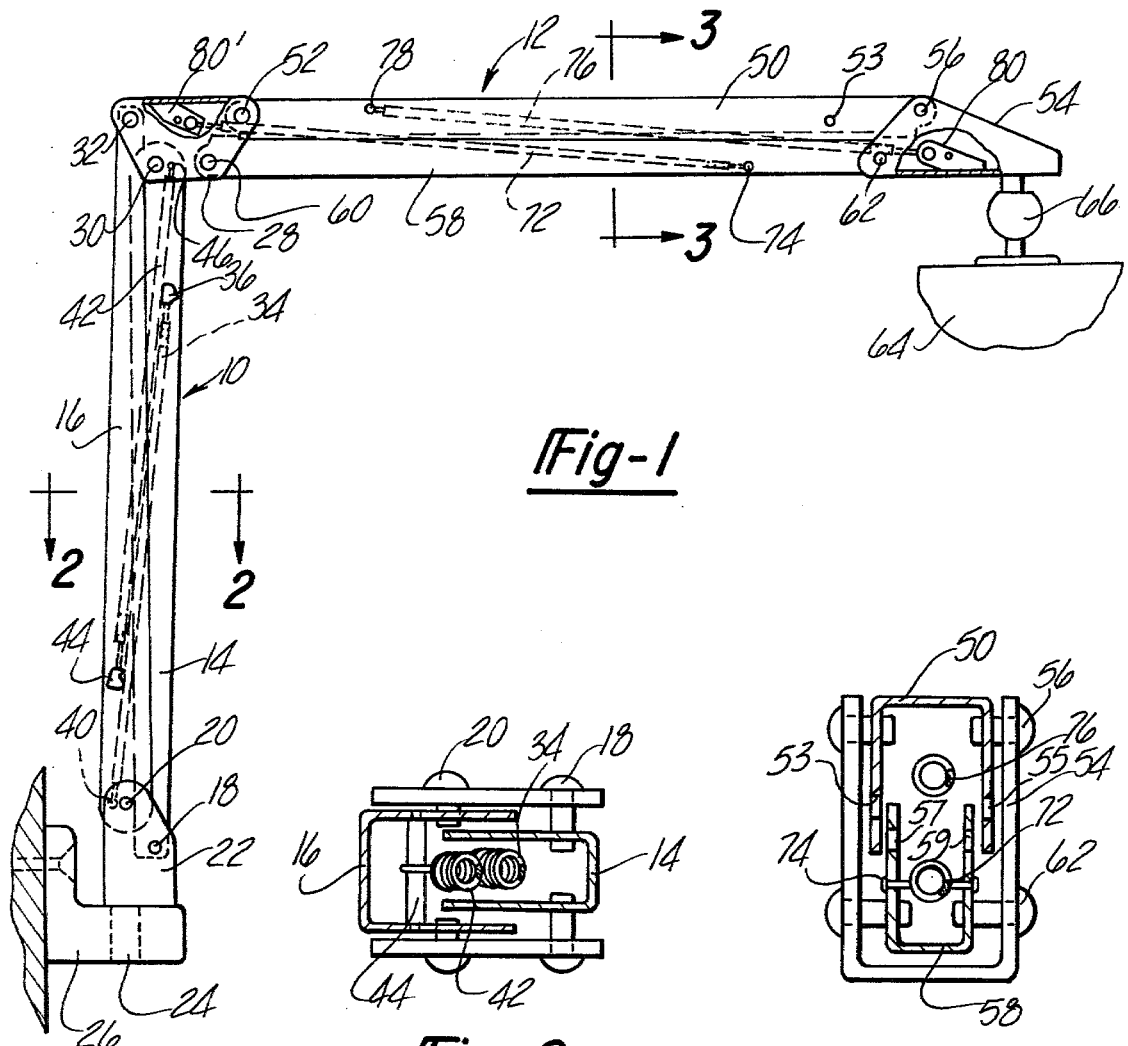
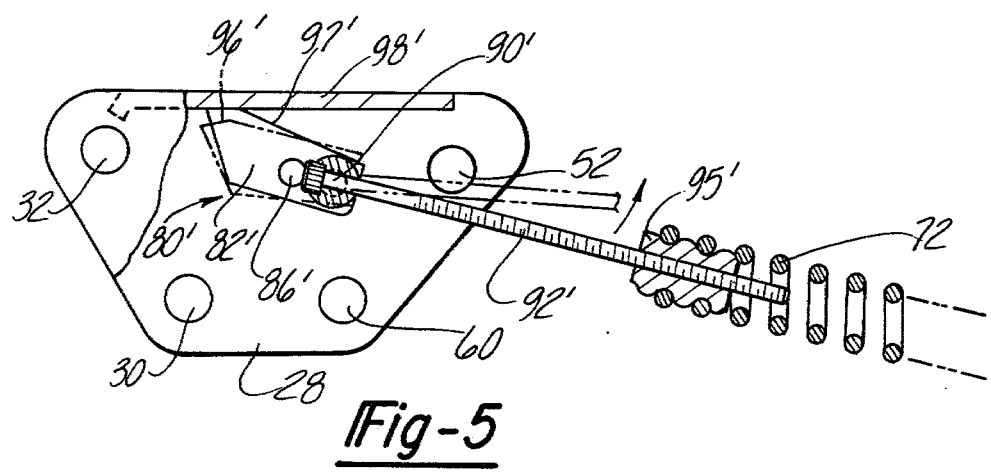

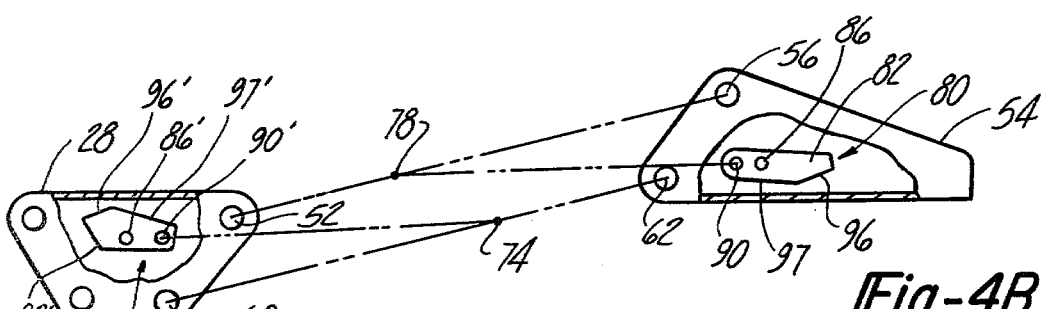
_Fig-4A_
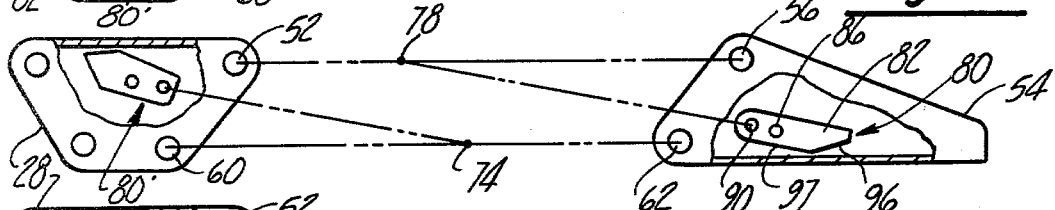
_Fig-4B_
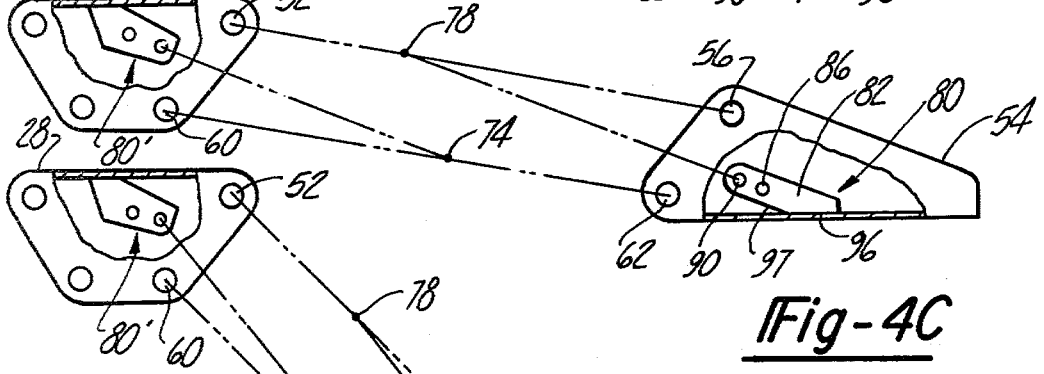
_Fig-4C_
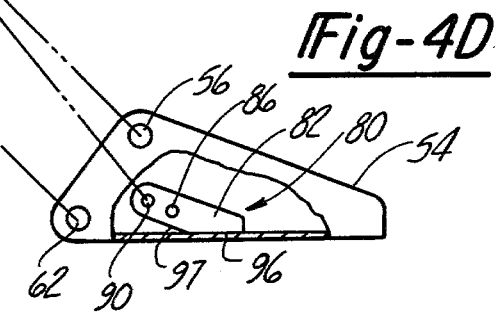
_Fig-4D_

EQUIPOISED ARTICULATED SUPPORT ARM

BACKGROUND OF THE INVENTION

This invention relates to equipoised articulated supporting arm structures. More particularly, it involves spring counterbalanced arm assemblies for supporting an object in an infinite number of positions.

Equipoised or counterbalanced arm structures have been long utilized to support objects such as lamps. These structures generally employ upper and lower arms each utilizing a parallelogram linkage mechanism. Typically, the two parallel links of the lower arm are pivoted at one end to a swivelling base bracket and at their other ends to a floating bracket. The links of the upper arm are pivoted at one end to the floating bracket and at their other ends to a support bracket for holding the object. The parallelogram linkage allows translations of loads supported at the free end of the linkage without any rotation so that a load such as a lamp or a TV set may be moved to different positions and still retain a constant rotational attitude. A spring coupled to the inner links of each arm provides an opposing moment to counterbalance the moment supplied by the object.

As is taught in U.S. Pat. NO. 2,090,439 to Carwardine, it is known that a mass mounted on the end of a pivoted lever and symmetrically placed can be exactly equipoised by a helical extension spring having a suitable spring rate and arranged to act between a point on the center line of the pivoted lever and a point vertically above its pivot. In other words, for the upper arm, the point of attachment of the spring must be on a vertical line through the point of attachment of the lower link to the floating bracket in order for the object to be exactly counterbalanced throughout its entire arc of movement. This general principle has been utilized in springing the upper arm for a variety of equipoised arm structures as shown, for example, in U.S. Pat. Nos. 3,426,190 to Bobrick and 4,080,530 to Krogsrud.

Special problems are encountered with the upper arm since the springs are in their most relaxed position when the arm is in the extreme outstretched position parallel to the horizon. Of course, in this position a maximum lifting force is needed in order to counterbalance the weight of the object since its mass exerts maximum moments on its suspension at that position. This lifting force is governed by substantially two factors. The first being the strength of the spring and the second being the angle between the longitudinal axis of the spring and the longitudinal axis of the arm, or the components of the spring vector that opposes the gravity force on the supported mass. This latter factor is limited by the shape of the floating bracket. In order to provide an aesthetically pleasing structure, the size of the bracket must be relatively small and, accordingly, the spacing of the spring end from the longitudinal axis of the arm is limited. Moreover, this distance is also limited if it is desired for the springs to be housed within the confines of the links of the arm member, which links can be conveniently formed into nesting U-shaped channels. However, given the current state of the art of spring materials, it is not possible to provide a spring which will counterbalance heavy loads, such as a 25 pound television set supported at the end of a 30 inch parallelogram arm if the width of the arm, and thus of the end brackets, is to be limited to a reasonable distance, such as two inches.

In one attempt to solve this problem, the point of attachment of the spring on the floating bracket was moved beyond the vertical extension of the lower link pivot point. (See U.S. Pat. No. 3,774,873 to Krogsrud). However, the equipoised arm assembly disclosed therein had to rely upon exposed springs to provide the counterbalancing forces. Unfortunately, this does not provide a pleasing appearance which is necessary for commercial acceptance. Even more importantly, by offsetting the point of spring attachment, non-linear counterbalancing forces are supplied by the springs as the object travels through its arc of movement. Accordingly, the object could not be stably positioned at an infinite number of positions which, not only is highly desirable, but may be necessary depending upon the use to which the object is put. For example, if the object is a television set which is being watched by an immobilized bedridden patient, the television set may have to be positioned only at a certain angle for the patient to watch the television.

OBJECT AND SUMMARY OF THE INVENTION

Therefore, it is the primary objective of this invention to provide a practical and aesthetically pleasing equipoising mechanism for counterbalancing heavy objects at an infinite number of positions.

According to the present invention, the mechanism includes a lower arm pivoted at its lower end to a base bracket and at its upper end to a floating bracket. A pair of parallel links pivoted at one end to the floating bracket and at their other ends to a supporting bracket for the object defines the upper arm for the mechanism. A spring is coupled at one end to the lower link of the upper arm between its respective pivot points. A connector mechanism in the floating bracket attaches the other end of the spring to a point displaced from the pivot point of the lower link on the floating bracket. Means are provided for altering the effective position of the spring attachment relative to the lower link pivot point as the upper arm is moved relative to the horizontal. Accordingly, the mechanical advantage of the spring is adjusted to symmetrically equipoise the object and substantially counterbalance the load throughout the entire arc of movement of the upper arm, even though the point of spring attachment is offset from the vertical line of the lower link pivot point. In other words, the attachment point of the spring to the floating bracket can be envisioned as being on a movable linkage which changes the physical locus of the spring attachment as a function of the position of the upper arm relative to the horizon. In such a manner, a bracket of relatively compact shape can be utilized and a spring can be used which is smaller than would be required in an arm conforming to Carwardine's teachings, allowing the spring to be hidden within the confines of the upper arm to provide an aesthetically pleasing device.

In one embodiment, the connector mechanism includes a linkage member pivotably coupled to the bracket, with the spring being coupled to the linkage member at a point spaced from the pivot point. The spring biases the linkage toward a pivot position in which a line between the pivot point of the link and the point of connection of the spring to the linkage is on an extension of the spring center line, so that the pivot point is the effective anchor point for the spring end in terms of the lifting moment that the spring exerts on the load. When a certain angle is reached during rotation of the arm, a surface on the linkage abuts a surface on the bracket to prevent further pivoting motion of the linkage as the arm continues to rotate. This effectively transfers the spring end attachment point for the balance of rotation of the arm to the point of connection of the spring to the linkage. This shift in the effective spring attachment point produces a resultant lifting force that is approximately correct for all arm angles over its remaining rotational range. In alternative embodiments, it would be possible to provide additional effective spring attachment point shifts at spaced points in the arm rotation range to more closely approximate the ideal force component.

In an alternative embodiment, the connector member is a horn shape linkage member affixed to the bracket, with the mouth of the horn facing the spring. The spring is attached to the apex of the linkage member by a cable. Accordingly, when the upper arm is rotated, the cable rides on the arcuate surface of the linkage member to effectively change the locus of the spring attachment. Therefore, the otherwise resulting non-linear counterbalancing forces are automatically compensated. With the correct cam shape, the exact required counterbalancing force may be achieved through the entire arm range of movement.

BRIEF DESCRIPTION OF THE DRAWINGS

These and other objects and advantages of the invention will become apparent upon reading the following specification, and by reference to the drawings in which:

FIG. 1 is a plan view with parts broken away of one embodiment of the equipoising mechanism of the present invention;

FIG. 2 is a cross-sectional view along the lines of 2—2 FIG. 1;

FIG. 3 is a cross-sectional view along the lines 3—3 of FIG. 1;

FIG. 4A-4D are side plan views of the upper arm with parts broken away to illustrate the changing location of the spring attachment points as the upper arm moves relative to the horizontal;

FIG. 5 is a cross-sectional view of the floating bracket shown in FIG. 1;

DESCRIPTION OF THE PREFERRED EMBODIMENTS

Figure 7:
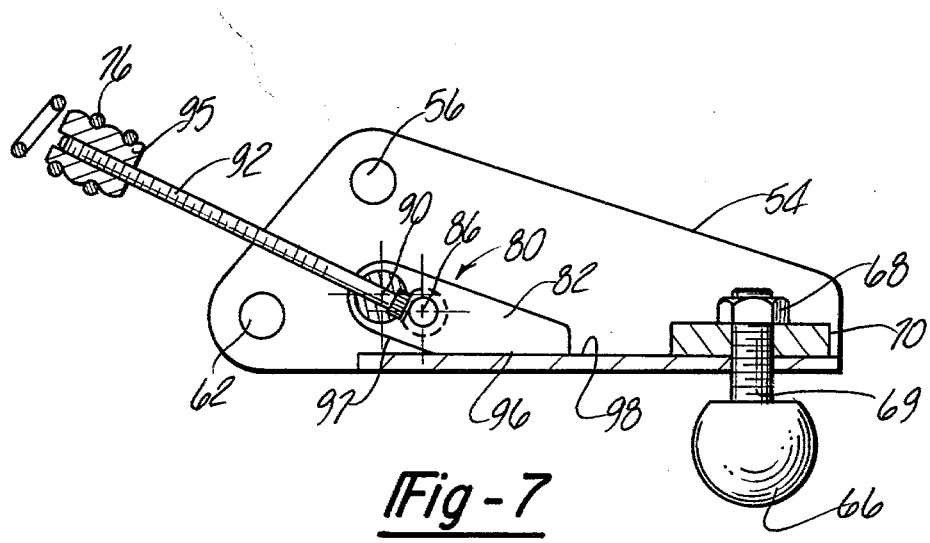
FIG. 7 is a cross-sectional view along the line 7—7 of FIG. 6.

Referring now to FIG. 1, the equipoising mechanism of the present invention includes lower arm 10 and upper arm 12, each employing conventional parallelogram linkages. Lower arm 10 includes an inner link 14 and an outer link 16. Links 14 and 16 are pivoted about points 18 and 20 at their lower end on base bracket 22. Base bracket 22 includes a pin 24 depending from lower portions thereof into a corresponding socket in a wall bracket 26. The upper ends of links 14 and 16 are coupled to floating bracket 28 at points 30 and 32, respectively. Lower arm 10 also employs a conventional spring arrangement in which spring 34 is coupled at one end to link 14 by a pin 36, and at its opposite end to link 16 via pin 40. Similarly, spring 42 is coupled to outer link 16 by pin 44 and to inner link 14 via pin 46. Accordingly, lower arm 10 may swivel about an axis defined by pin 24 and may pivot to the left or right of the vertical position shown in FIG. 1, with the arm 10 and associated springing arrangement counterbalancing the forces in a conventional manner.

Special attention should now be drawn to the upper arm 12. Arm 12 employs a conventional parallelogram linkage in which upper link 50 is coupled to floating bracket 28 by pin 52 and at its other end to support bracket 54 by pin 56 therein. Lower link 58 is similarly coupled at one end to floating bracket 28 by pin 60 and at its other end to support bracket 54 by pin 62.

The object 64, such as a television set, is coupled to support bracket 54 by conventional means such as a ball and socket arrangement 66 mounted on the lower portions of bracket 54 via nut 68, bolt 69, and washer 70 arrangement which can be seen most clearly in FIG. 7.

Turn now to the unique spring arrangement for upper arm 12 according to one embodiment of this invention. Spring 72 for the lower link 58 includes a hook at its end portion which engages a pin 74 between the respective pivot points 60 and 62 of link 58. Analogously, one end of spring 76 for upper link 50 is connected about pin 78 located about the center line between upper link pivot points 52 and 56. However, the opposite ends of springs 72 and 76 are coupled to a unique swivelling connector mechanisms 80, 80' in support bracket 54 and floating bracket 28, respectively. The connector mechanisms 80 and 80' are functionally identical. Consequently, only the connector mechanism in support bracket 54 will be described in detail and common parts of the connector mechanism in floating bracket 28 will be designated by the same reference numberal with a prime superscript in the drawings.

Figure 6:
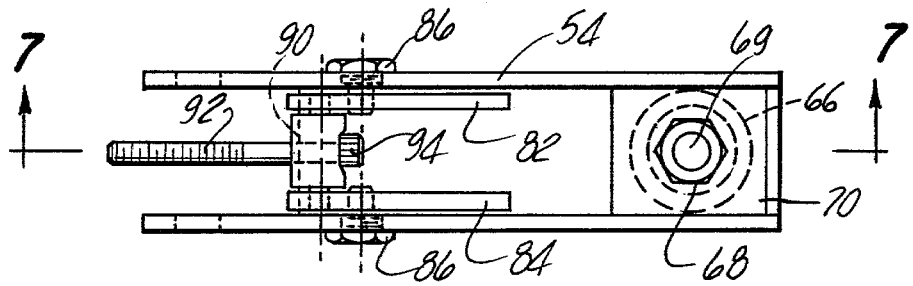
FIG. 6 is a top plan view of the support bracket shown in FIG. 1.

Turning then to FIGS. 6 and 7, connector mechanism 80 includes two identical pivot plates serving as linkage members 82 and 84, which are pivotally connected to bracket 54 along a common horizontal axis by pins 86. A swivel pin assembly 90 is rotatably mounted along an axis parallel to but spaced from the axis of pins 86 which defines the pivot point for members 82 and 84. An adjustment screw 92 has its shaft portion mounted through a bore in pin 90 normal to its rotational axis. Screw 92 includes a head 94 having a socket which may engage a screw driver for rotating screw 92. The far end of screw 92 is coupled to an insert 95 having a spiral grooved periphery to which the end of spring 76 is connected. Accordingly, the tension on springs 76 and 72 can be adjusted by screws 92 and 92', respectively, to accommodate different loads.

Linkage members 82 and 84 each include a flat surface 96 which provides a stop for abutting the lower surface 98 of bracket 54. It is important to note that the effective point of attachment of the spring 76 is point 86 until the rotation of arm causes the stop 96 to bottom out aginst the surface 98 of bracket 54. When the linkage members 82, 84 bottom out against surface 98, the effective spring attachment point is shifted changing the effective mechanical advantage of the mechanism.

This arrangement provides two effective attachment points for the spring, each servicing one portion of the arm disposition range and thereby approximating the ideal arrangement in which an appropriate counterbalancing force is provided for all arm positions. An alternative embodiment of our invention which is disclosed in detail hereinafter, provides continuous adjustment of the effective spring attachment point with arm motion to achieve this ideal. Embodiments which provide multiple discontinuous shifts are also within the scope of the invention.

Turn now to FIGS. 4A–4D. In FIGS. 4A–4B, surface 98 of the linkage members is lifted from surface 98 so that the effective spring attachment is at point 86. However, when arm 12 is moved downwardly to a point slightly below the horizontal (FIG. 4C) the effective spring attachment point shifts from point 86 to point 90. As can be seen in FIGS. 4A and 4B, points 78, 90 and 86 form a straight line when the effective spring attachment point is point 86. As arm 12 moves downwardly as shown in FIGS. 4C and 4D, surface 96 bottoms out so that the effective spring attachment point is shifted to point 90. Accordingly, the effective point of spring attachments are adjusted at a single point in the arm range by the unique action of connector members 80, 80' to provide an approximation of the ideal counterbalancing action needed to balance object 64 at an infinite number of positions. It should also be understood that the same interaction takes place with connector member 80' in floating bracket 28 as can be seen in FIGS. 4A–4D.

Figure 8:
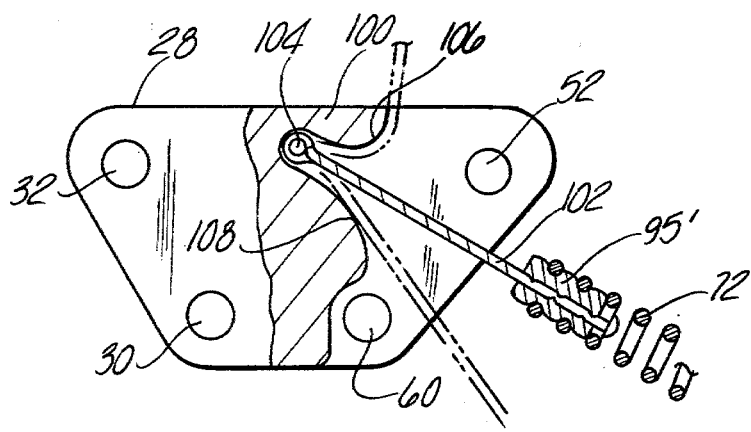
FIG. 8 is a cross-sectional view of an alternative embodiment of this invention shown in conjunction with the floating bracket.

FIG. 8 shows an alternative embodiment of the connector mechanism for the springs of the upper arm 12 which provides continuous and exact compensation for all dispositions. FIG. 8 is a cross-sectional view showing this alternative embodiment in floating bracket 28. Consequently, common reference numerals will be utilized to reference common elements described in connection with FIGS. 1–7. In the alternative embodiment shown in FIG. 8, a horn shaped member 100 is rigidly attached to floating bracket 28 with the mouth of the horn facing the spring 72 such that the major longitudinal axis of the horn passes through point 74 when arm 12 is slightly below the horizontal position. In general, the contour and orientation of the horn is a function of the range of motion of the arm relative to the horizontal. A cable 102 coupled at one end to insert 95' holding spring 72, is attached at the other end to apex 104 of member 100. Therefore, as arm 12 is rotated about the horizontal, the effective point of spring attachment is adjusted relative to point 104 by the cable 102 riding on the arcuate inner surfaces of member 100. For example, when the arm 12 is rotated upwardly as shown in the phantom lines in FIG. 8, the effective point of spring 72 attachment is at point 106 when arm 12 is substantially in its most upright position. In comparison, when arm 12 is rotated downwardly to approximately a 45° angle, the effective point of spring attachment is at point 108. It should be noted that a similar member 100 and connections thereto are provided in floating bracket 54.

From the foregoing, it can now be realized that the present invention provides a compact and aesthetically pleasing equipoised arm structure in which the mechanical advantage of the springing arrangement for the upper arm is conveniently adjusted to provide symmetrical counterbalancing throughout the entire movement of the upper arm. Accordingly, the object 64 can be positioned at an infinite number of positions. Furthermore, the springs can be entirely enclosed within the U-shaped channel members forming the links for the parallelogram arm structure.

According to another aspect of this invention, links 14 and 16 of lower arm 10 are tapered about their longitudinal axis. The tapers of the link pair are complementary so that their combination has a rectangular side projection. For example, link 14 is narrowest at pivot point 18 where no width is required and widest at pivot point 30 so that the lateral spacing of spring connection pin 46 may be maximized from point 30 to gain the maximum mechanical advantage. Link 16 is widest at point 20 and narrowest at point 32. The combined width of links 14 and 16 is constant along their lengths, providing an arm of minimum thickness and also avoiding interference problems which would arise if the link sections were each formed with constant widths along their lengths.

The particular choice of tapers also determines the range of motion of the arm between the limits at which interference occurs between the links and the pivot pins of the opposing links. By way of example, links 14 and 16 are shown in FIG. 1 in a vertical alignment in which pin 20 is in contact with the adjacent edge of link 14 and pin 30 is in contact with the adjacent edge of link 16, both contacts limiting further counterclockwise rotation of the arm. Clockwise rotation is permitted until pin 18 contacts the adjacent edge of link 16 and pin 32 contacts the adjacent edge of link 14. This occurs when the arm is pivoted downwardly about 20° below the horizon. Different degrees of taper would provide different motion ranges.

Figure 9:
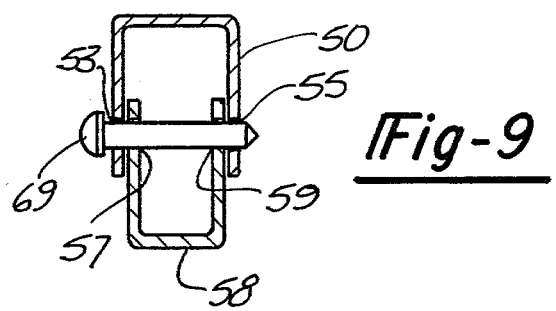
FIG. 9 is a cross-sectional view of the upper arm when in its lowermost position with a locking pin engaging the links.

FIG. 9 illustrates a feature of this invention which permits the user to remove and/or replace the object 64. As can be seen in FIGS. 1 and 3, upper link 50 includes two holes 53 and 55 centered about a common axis. Similarly, lower link 58 includes holes 57 and 59 which are likewise disposed near support bracket 54. As can be seen in FIG. 3, when the upper arm 12 is substantially horizontally disposed, the holes 53, 57 and 55, 59 are misaligned. However, when the lower arm is rotated downwardly to approximately the vertical direction, the holes line up as shown in FIG. 9. This is due to the change in spacing between link 50 and 58 as the arm rotates through its various positions. When the arm 12 is in the position shown in FIG. 9, a pin 71 may be placed through the holes in links 50 and 58. In such manner, the links 50 and 58 are locked together thereby preventing further movement of the upper arm 12. With pin 71 in place, the user can remove the object 64, such as a relatively heavy television set, without the upper arm recoiling which would otherwise result due to the spring biasing in the upper arm.

Figure 10:
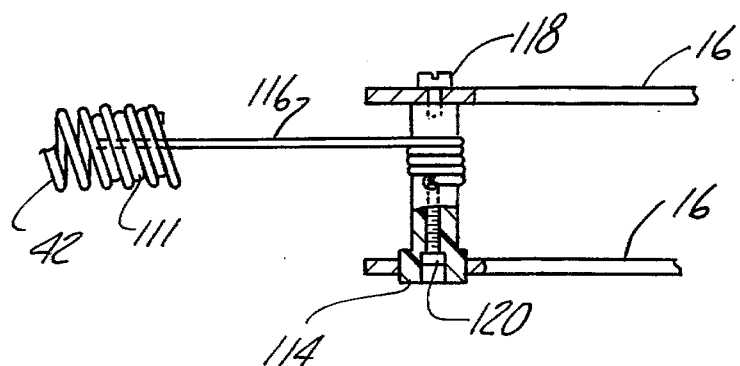
FIG. 10 is a top plan view of an alternate method of attaching the springs to the connector mechanism.
Figure 11:
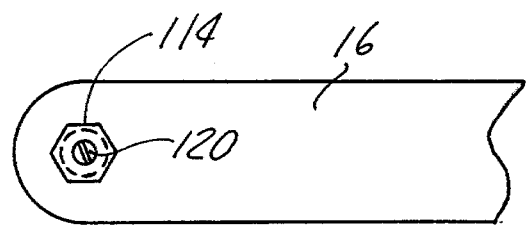
FIG. 11 is a side view of FIG. 10.

FIGS. 10 and 11 show still another alternate method of attaching the springs to the connector mechanism of the base arm at points 36 and/or 44. This method may be employed with either arm but is described with reference to the lower arm 10 as employed in the outer link 16. This embodiment employs a pin like drum 110 having an aperture 112 extending transverse to the major longitudinal axis of drum 110. Drum 110 preferably includes at least one enlarged hexagonal head 114 which is fixed within a hex hole in one side of link 16 to prevent rotational movement of drum 110. The opposite end of drum 110 is journaled by a screw 118 passing through a hole in the opposite side of link 16. The screw 118 may be loosened to allow the hex end 114 to be withdrawn from its hole so that the drum 119 may be rotated. A flexible cable 116 coupled at one end to the spring 42 by an insert 111 is threaded through aperture 112 to prevent slippage thereby maintaining the desired tension on spring 42. In such manner, the tension of the spring can be easily adjusted to accommodate different loads. A lock screw 120 fixes the end of the cable in the hole 112.

Therefore, while this invention has been described in connection with particular examples thereof, no limitation is intended thereby except as defined by the appended claims.

The embodiments of the invention in which an exclusive property or privilege is claimed are defined as follows:

1. In an equipoising mechanism for supporting an object at an infinite number of positions, said mechanism having a lower arm pivoted at its lower end to a base bracket and at its upper end to a floating backet, and an upper arm comprised of a pair of parallel links pivoted at one end to the floating bracket and at their other ends to a supporting bracket for the object, wherein the improvement comprises:
   spring means coupled at one end to one of the links of the upper arm between the pivot points of that link;
   connector means for attaching the other end of the spring to a point on said floating bracket; and
   means on said floating bracket for altering the effective position of said spring attachment point relative to said bracket as said upper arm is moved wherein the mechanical advantage of the spring is adjusted to symmetrically equipoise the object at an infinite numbeer of positions.

2. The improvement of claim 1 which further comprises:
   second spring means coupled at one end to the other link of the upper arm between the pivot points of such link;
   second connector means in said support bracket for attaching the other end of the second spring to a point on the support bracket; and
   means on said support bracket for altering the effective position of said second spring attachment point relative to said upper link-support bracket pivot point as the upper arm moves.

3. The improvement of claim 1 or 2 wherein said floating bracket connector means attaches the spring to a point horizontally beyond a vertical line extending from the pivot point of the one link of the floating bracket at at least certain attitudes of the arm; and wherein said second connector means attaches the second spring to a point horizontally beyond a vertical line extending from the pivot point of the other link at at least certain attitudes of the arm.

4. The improvement of claims 1 or 2 wherein each of said connector means includes a pivot plate rotatably coupled to its respective bracket about one pivot point, with said spring being attached to said plate at a point spaced from said pivot point, and stop means for abutting a surface as the plate is rotated about its pivot during movement of the upper arm, thereby changing the locus of the spring attachment point.

5. The improvement of claim 4 wherein each connector means includes a pair of substantially identical pivot plates which are coupled to their respective brackets along a common horizontal axis, and wherein the spring is coupled to a pin passing only through the two pivot plates along a line parallel to said axis.

6. The improvement of claim 1 further including adjustable means connected to at least one end of said spring means operative to alter the tension of the spring at a given arm position to accommodate different loads.

7. The improvement of claim 4 wherein each connector means includes a pair of substantially identical pivot plates which are coupled to their respective brackets along a common horizontal axis, a drum mounted between said pivot plates, said drum having an aperture extending transversely to the major longitudinal axis thereof for receipt of a flexible cable and means for securing the cable in the aperture to thereby maintain the desired tension on its respective spring.

8. The improvement of claim 7 wherein said means for securing the cable in said aperture comprises a set screw.

9. The improvement of claims 1 or 2 wherein said links are U-shaped channel members which nest within each other and provide a housing for enclosing said springs.

10. The improvement of claims 1 or 2 wherein each of said connector means comprises a horn shaped cam member affixed to its respective bracket with the mouth of the horn facing the spring, said spring being attached about the apex of the member.

11. The improvement of claim 10 which further comprises cable means coupled at one end to the apex of said cam member and at the other end to the spring, with the length of the cable being longer than said member so that the cable engages the arcuate sides of the member as the arm is rotated.

12. The improvement of claim 1 wherein said links of one of said arms each include an opening therein which become aligned when said arm is in a particular position, and means for engaging said aligned openings to prohibit relative motion of the links thereby preventing movement of said arm when the object is removed.

13. The improvement of claim 12 wherein said means for engaging said openings is a pin which extends through the openings to prevent movement of the links of the arm relative to one another.

14. An equipoising mechanism for supporting an object at an infinite number of positions, said mechanism comprising a lower arm including a pair of parallel links pivoted at one end to a base bracket and at their upper ends to a floating bracket, and an upper arm pivoted at one end to the floating bracket and at its other end to a supporting bracket for the object, spring means for counterbalancing the object, and each of said links being complementarily tapered along their longitudinal axis, with the widest end of one link mounted adjacent the smallest end of the other link on the same bracket whereby to provide a complete, minimum thickness, enclosure for the counterbalancing springs throughout the range of movement of the arm.

15. The mechanism of claim 14 wherein said links comprise U-shaped channel members which nest with each other.

16. The mechanism of claim 14 wherein the tapered edges of the links contact associated parts of the mechanism to limit motion of the arm.

* * * * *

UNITED STATES PATENT AND TRADEMARK OFFICE
CERTIFICATE OF CORRECTION

PATENT NO. : 4,266,747

DATED : May 12, 1981

INVENTOR(S) : James J. Souder, Edward D. Scarborough, Jr., Merlin D. Fox

It is certified that error appears in the above-identified patent and that said Letters Patent are hereby corrected as shown below:

Column 3, line 64 "parallogram" should be --parallelogram--.

Column 4, line 42 "numberal" should be --numeral--.

Column 4, line 65 "aginst" should be --against--.

Column 5, line 13 "98" (first occurrence) should be --96--.

Column 7, line 32 "numbeer" should be --number--.

Signed and Sealed this

Twenty-seventh Day of October 1981

[SEAL]

Attest:

Attesting Officer

GERALD J. MOSSINGHOFF

Commissioner of Patents and Trademarks